March 18, 1958   R. SAULNIER   2,827,317
REMOVABLE YOKE-PIN WITH HAND-ACTUATED LOCKING MEANS
Filed May 20, 1954
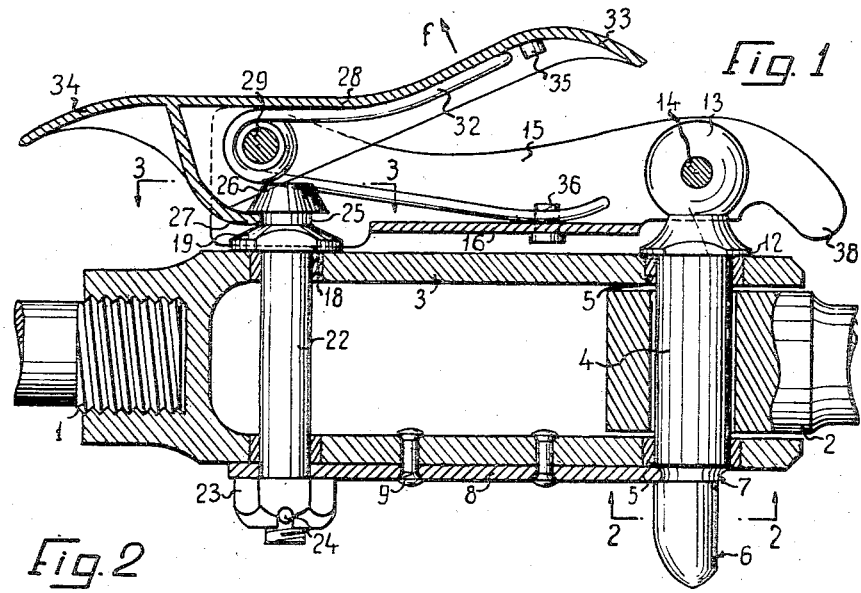
Inventor
Raymond Saulnier
By Brog Stewart
his Attorneys

United States Patent Office 2,827,317
Patented Mar. 18, 1958

2,827,317

REMOVABLE YOKE-PIN WITH HAND-ACTUATED LOCKING MEANS

Raymond Saulnier, Paris, France

Application May 20, 1954, Serial No. 431,181

Claims priority, application France May 22, 1953

1 Claim. (Cl. 287—100)

This invention relates to a removable yoke-pin or, more generally, to any axle, spindle, pivot or pin removably mounted between two opposed walls or, even between two opposed portions of a same wall, e. g. cylindrical, of any member, the active portion of said axle, spindle, pivot or pin being that located between said two walls.

The invention has for its purposes to provide such a removable yoke-pin with hand-actuated locking means adapted to permit easy and quick mounting and removal of the yoke-pin without requiring the use of any tool, said locking means being furthermore so designed as to ensure a perfect safety.

An object of the invention is therefore to provide means to lock a removable yoke-pin against axial displacement in its mounting holes within a certain angular zone, a hand-control member to rotate the yoke-pin in said holes and hand-actuated locking means to hold said hand-control member anchored on said yoke in an angular position of the pin comprised within said angular zone.

Another object of the invention is to provide the yoke-pin with an abutment adapted to be brought into contact with one arm of the yoke, once the pin has been driven home in its mounting holes.

A further object of the invention is to relatively design the hand-control member of the yoke-pin, an anchoring part fixedly secured on the yoke and the hand-locking means of said hand-control member on said anchoring part in such a manner as to ensure a correct relative positioning that suppresses any risk of incomplete anchoring.

Still another object of the invention is to provide the hand-actuated locking means with abutments limiting their unlocking angular stroke, so that they can be engaged on the anchoring part only when the yoke-pin is both driven home in its mounting holes and located in an angular position in which it is locked against axial displacement therein.

An additional object of the invention is to provide the above-mentioned hand-control member with a cam-like surface adapted to be used as a lever bearing on the yoke to facilitate withdrawal of the yoke-pin from its mounting holes.

Other objects and advantages of the invention will be apparent from the following detailed description together with the appended drawings submitted for purpose of illustration only and not intended to define the scope of the invention.

In the drawings:

Fig. 1 is a longitudinal sectional view of a yoke provided with a quick removable pin according to the invention;

Fig. 2 is a part sectional view along line 2—2 of Fig. 1;

Fig. 3 is a part sectional view along line 3—3 of Fig. 1;

Fig. 4 is an elevational view corresponding to Fig. 1 showing the parts during withdrawal of the yoke-pin.

Referring to the drawings, the invention is shown in a particular application in which a yoke 3 is used for connecting two members 1 and 2 of a linkage or cable, such as used for the controls of an airplane, in which quick disconnection of such controls is a very important point.

One of the parts to be removably interconnected, such as 1, is secured e. g. by screwing, as shown, on the yoke 3, while the other part 2 is provided with a transverse opening through which it is anchored on the yoke-pin 4. The invention aims at permitting easy and quick mounting and removal of the yoke-pin 4 and, hence, interconnection or disconnection between parts 1 and 2 without any tool and in good conditions of safety.

In the example shown, the yoke-pin 4 is passed through steel rings 5 forcedly secured in aligned holes provided in the arms of yoke 3; the presence of said rings permits avoiding deformation of the light alloy such as Duralumin, which the yoke is made of. The leading end of pin 4 has been given an ogival shape to facilitate its introduction into its mounting holes and it is provided with a flat portion 6 (see also Fig. 2) extending in a plane parallel to the axis of the pin from its leading end to the bottom of a circumferential groove 7 which, when the pin is mounted, is flush with the outer face of the yoke-arm through which pin 4 is last passed. A locking plate 8, secured on said arm of the yoke, e. g. by means of rivets 9, is engaged, when pin 4 is mounted, in the groove 7, thus locking said pin against axial displacement in its mounting holes.

The trailing end of pin 4 is provided with a shoulder 12 bearing, again when the pin is mounted, on the outer face of the other arm of the yoke. Said pin trailing end also carries a slotted head 13 between the arms of which is engaged a hand-control lever 15 articulated on said head by means of a pivot-pin 14. The hand-control lever 15 is essentially constituted by two flanges interconnected through a cross-bracing plate 16. The two flanges of the lever 15 are adapted to straddle the head 19 of a bolt 22, which head acts as an anchoring stud for said lever, as explained hereunder. The straddling of the lever on said stud takes place with accuracy, thanks to the presence of two parallel flat portions 17 and 18 extending in the same direction as said flanges when the lever is in straddling position and the distance of which is substantially equal to the spacing of the flanges of said lever. In the example shown, bolt 22 passes through both arms of the yoke 3 on which it is rigidly secured by means of a nut 23, provided with conventional locking means, such as a cotter-pin 24. In the example shown, bolt 22 also passes through the locking plate 8, thus contributing to hold the same strongly secured on the yoke. As mentioned above, the head of bolt 22 is intended to act as an anchoring stud for the control-lever 15. To this effect, it is provided with a circumferential groove 25 and terminates outwardly in a frusto-conical mushroom-head 26 ensuring automatic centering of the flanges of the control-lever as the same is brought into straddling position on its anchoring stud. A hooking dog 27 provided with a semi-circular notch (see also Fig. 3) which has a radius adapting it to fit the bottom of groove 25, when said dog is engaged in said groove, ensures safe locking of the control-lever 15 on which said dog, which is integral with a trigger 28, is articulated by means of a pivot-pin 29. Said trigger 28 is urged in the direction of arrow f around pin 29 by a spring 32, e. g. made of a piano wire wound around pin 29 and the ends of which respectively bear on the cross-bracing plate 16 of lever 15 and on one arm of trigger 28. The latter is further provided, for handling purposes, with two wings 33 and 34, slightly incurved towards the yoke, when lever 15 is anchored, so that wing 34 may be lifted with the index finger, while wing 33 is pressed upon with the thumb. Two complementary abutment studs 35 and 36 facing each other and respectively secured on the wing 33 of the trigger 28 and on the cross-bracing plate 16 limit the angular displacement of said trigger in a direction opposed to arrow f, while, in the direction of said arrow, the angular displacement of trigger 28, with respect to the control-lever 15 is limited by two lugs 37 (Fig. 4) integral with trigger 28 and adapted to abut against the edge of lever 15.

Finally, the flanges of lever 15 are provided in the vicinity of pivot-pin 14 with a cam-like portion 38 capable of bearing on the outer face of that arm of yoke 3 through which pin 4 is first passed, which permits using lever 15 to exert on pin 4 a multiplied axial stress to facilitate its withdrawal from its mounting holes, even when considerable pulling forces are being exerted between the interconnected parts 1 and 2.

The operation of this device is as follows:

Assuming that the yoke pin 4 is mounted and locked, as shown in Fig. 1, the following simple sequence of operations suffices to dismantle the assembly:

Trigger 28 is first tilted in the direction opposed to arrow f. This takes dog 27 out of groove 25, thus releasing the hand-control lever 15 from its anchoring stud 22—26; lever 15 is then slightly lifted to clear its flanges from said anchoring stud, whereupon it may be rotated substantially by about 180° to bring flat portion 6 of pin 4 in alignment with the edge of plate 8. Then the pin 4 may be withdrawn from its mounting holes, this being facilitated, if necessary, by the already mentioned stress-multiplying action of lever 15.

It is to be noted that this process is extremely rapid. A skilled operator may even effect unlocking and removal of the pin in one continuous motion of the hand.

For mounting the yoke-pin, the same process is repeated, but in a reversed order. When pin 4 is insufficiently engaged in its mounting holes, the obliquity of lever 15 with respect to the yoke prevents the hooking dog 27 from being engaged into groove 25. Any faulty mounting is therefore impossible.

It is also to be pointed out that in spite of the facility of handling, a good safety of locking of the control-lever is ensured, on the one hand, due to the shape of dog 27 which exactly fits in the bottom of groove 25 and, on the other hand, due to the positioning of the flanges 15 of said lever on either side of head 19 of bolt 22.

It is to be understood that the invention is in no way limited to the examples described and shown and that it may be effected with numerous modifications within the reach of those skilled in the art without departing from the spirit of the invention.

In particular, while the cut-off portion provided at the leading end of pin 4 has been shown and described as a flat portion 6, the edge of the locking plate 8 being rectilinear, it is obvious that other shapes could be adopted. Thus, the edge of the locking plate could be adapted to the periphery of the circumferential groove 7, while the cutoff portion provided at the leading end of pin 4 could be than given a suitable corresponding outline, such as a complementary convex one.

What is claimed is:

A dismountable assembly comprising, in combination, a yoke member having two parallel arms provided each with a circular aperture, the aperture in one arm being in alignment with the aperture in the other arm, a headed pin having a stem movable through said apertures and including a non-circularly shaped portion adjacent the stem end, pin locking means positioned on said one arm and adapted to cooperate with said portion of said stem remote from the head of the pin, whereby upon insertion of said stem through said apertures followed by a turning movement of the pin the latter is secured in said arms against lengthwise displacement, a first lever pivotally supported on said head of the pin, anchoring means fixedly secured to the said other arm, a spring pressed second lever pivotally supported on said first lever at the free extremity thereof, and catch means carried by said second lever to engage said anchoring means under the action of said spring after said first lever has been moved to effect said turning movement of the pin and into a position in which said free extremity thereof lies adjacent said anchoring means.

References Cited in the file of this patent

UNITED STATES PATENTS

| 192,084 | Root | June 19, 1877 |
| 630,169 | Black | Aug. 1, 1899 |
| 2,002,922 | Onken | May 28, 1935 |
| 2,324,963 | Thomas et al. | July 20, 1943 |
| 2,484,759 | Starr | Oct. 11, 1949 |